TAPE HANDLING APPARATUS

Filed May 31, 1968 4 Sheets-Sheet 1

INVENTOR
DAVID ARTHUR LONGLAND
BY Hane and Baxley
ATTORNEYS

INVENTOR
David Arthur Longland
BY Hane and Baxley
ATTORNEYS

INVENTOR
David Arthur Longland
BY Hane and Baxley
ATTORNEYS

INVENTOR
David Arthur Longland
BY Hane and Baxley
ATTORNEYS

United States Patent Office 3,525,481
Patented Aug. 25, 1970

3,525,481

TAPE HANDLING APPARATUS

David Arthur Longland, Ascot, England, assignor to International Computers and Tabulators Limited, London, England, a British company Filed May 13, 1968, Ser. No. 728,673
Claims priority, application Great Britain, May 16, 1967, 22,617/67
Int. Cl. G11b *15/06, 23/12, 15/58*
U.S. Cl. 242—183 6 Claims

ABSTRACT OF THE DISCLOSURE

Tape handling apparatus is described, particularly suitable for handling magnetic tape, in which, in normal use during a first phase of operation, the tape is moved between two reels across a reading and/or recording head structure and in which loops of tape are held in reservoirs respectively on either side of the head structure. During this normal phase of operation tape reel drive motors are so controlled in relation to each other that predetermined loops of tape are held in the reservoirs. Provision is made for a high speed rewind operation during a second phase and in this phase one tape reel motor is first operated at slow speed to withdraw the tape from the nearest reservoir. After withdrawal, this first motor is accelerated to a high speed until the tape is rewound, the other, second, tape reel motor meanwhile being controlled to maintain the tape loop in the second reservoir during rewinding. The initiation of acceleration is controlled by movement of the tape between the second reservoir and the second tape reel as the result of the total withdrawal of tape from the first reservoir.

BACKGROUND OF THE INVENTION

Field of the invention

Magnetic recording tape is used in conjunction with tape handling apparatus, for example, for the storage of information in data processing apparatus. In such tape handling apparatus magnetic tape is initially wound on a supply reel. One end of the tape then passes along a predetermined path across a reading and/or writing head and is wound onto a takeup reel. During the normal operation of the apparatus the tape is advanced across the head by the cooperation of the two reels, which are provided with drive motors for this purpose. Since the motors are frequently required to stop and start it is usual to provide a reservoir capable of holding a short length of tape in association with each of the tape reels. The reservoirs frequently take the form of open-ended vacuum compartments into which loops of tape are drawn by suction, and the reservoirs usually incorporate devices for determining the size of the loops actually held in the reservoirs. A control arrangement is used to maintain the tape loops at a predetermined size by controlling the tape reel motors to pay out or take in the tape.

Description of the prior art

The normal speed of movement of the tape between the reels is arranged to be compatible with the speed at which items of information written on to or read off the tape can be handled by the apparatus with which the tape handler is associated. However, it is desirable that in moving long lengths of tape, such as is the case during rewinding of the tape back on to the supply reel for example, that such tape movement shall take place at high speed. It has previously been proposed to withdraw the tape loops from both the reservoirs during a rewind operation. While this method of rewinding is satisfactory where the rewinding speed is not significantly great as compared with the normal speed of tape movement, or where the rewinding is continued until the entire tape has been wound back onto the supply reel, damage to the magnetic tape may be caused where the fast winding speed is very great or where it is required to arrest the fast winding operation while the tape is held upon both reels.

SUMMARY

According to the present invention tape handling apparatus includes first and second reels about which opposite ends respectively of an elongate tape may be wound; a pair of drive motors, one for each of said reels, selectively operable to rotate the reels respectively to move tape along a path from one reel to the other; first and second tape reservoirs associated respectively with said first and second reels, each reservoir arranged to hold a loop of tape, the reservoirs being positioned adjacent the tape path between the reels; control means operatively connected to the drive motors to produce movement of the tape, including means for maintaining a predetermined loop of tape in each of the reservoirs during tape movement in a first phase of operation, and means for generating an indicating signal representing the occurrence of movement of tape between said second reel and said second reservoir; and a signal generator connected to the control means operable to produce a fast wind signal signifying a second phase of operation, the control means being responsive to said fast wind signal to initiate said second phase and to operate that motor associated with said first reel at a slow speed to withdraw the tape from said first reservoir only and being responsive to said indicating signal during said second phase of operation to cause acceleration of said drive motor associated with said first reel after the tape has been withdrawn from said first reservoir.

Thus, in apparatus according to the present invention during a fast wind phase of operation, the tape is fed from the reading/recording head to the winding reel without the intervention of a loop storage reservoir, while at the same time a loop of tape is maintained in association with the other reel to provide a buffer against tape damage due to snatching or rapid deceleration.

DESCRIPTION OF THE PREFERRED EMBODIMENT

Figures 1, 2:
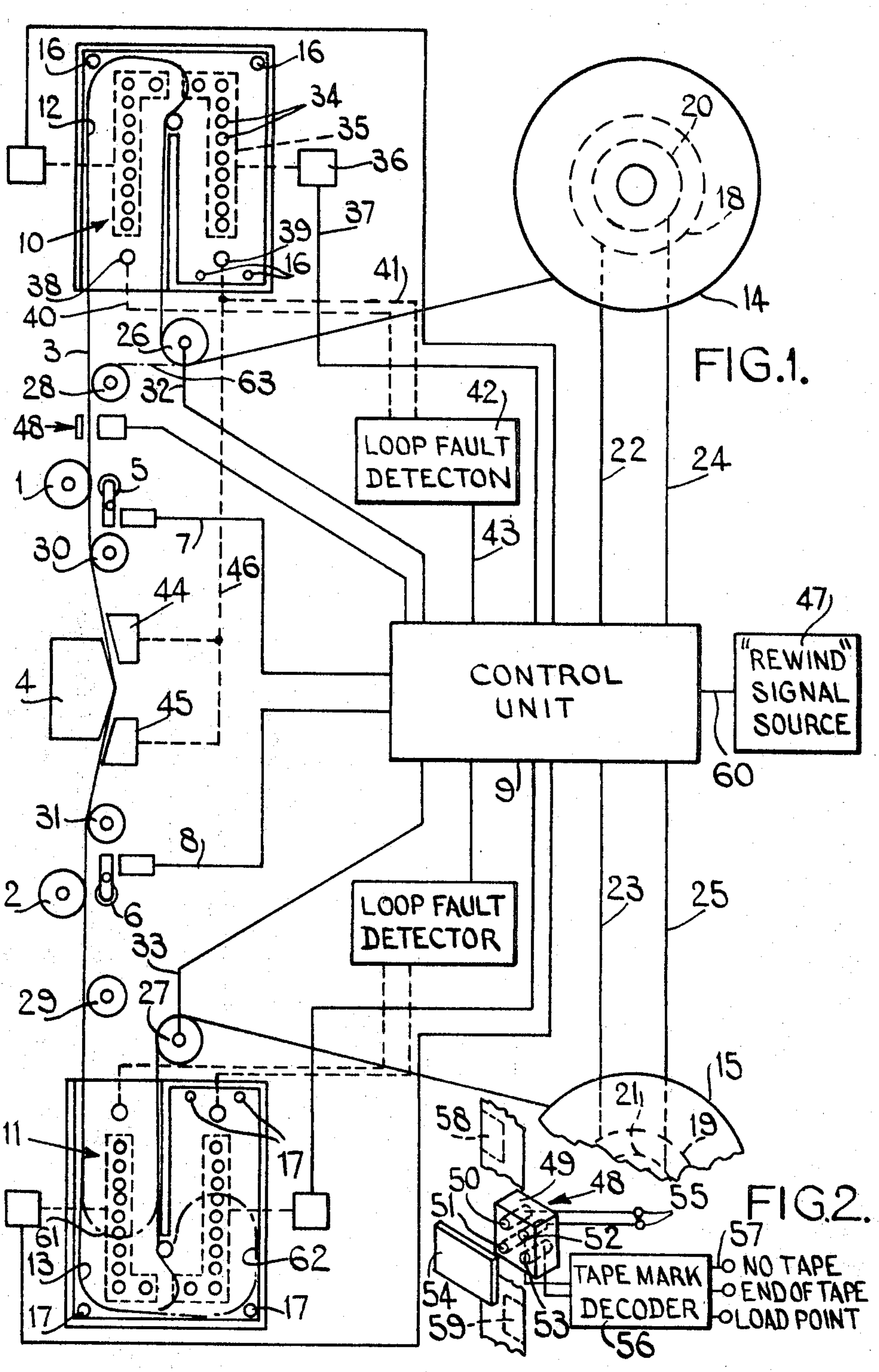
FIG. 1 shows a schematic front view of part of a tape handling apparatus.
FIG. 2 shows a schematic pictorial view of a tape mark sensing device.

Referring now to FIG. 1 of the drawings, a tape handling apparatus includes a pair of oppositely rotating capstans 1 and 2, arranged to drive a magnetic tape 3 forwards or backwards past a reading/recording head assembly 4. Either of two pinch rollers 5 and 6 may be moved by electromagnetic actuators to press the tape 3 against the corresponding capstan 1 or 2, respectively to cause the required forward or backward movement of the tape 3. Operation of the actuators for the rollers 5 and 6 is controlled over cables 7 and 8, respectively, from a main control unit 9.

Two open-ended tape reservoirs 10 and 11 are arranged, respectively, to receive a tape loop 12 formed from a slack length of the tape 3 between the capstan 1 and a tape reel 14, and a tape loop 13 similarly formed between the capstan 2 and a tape reel 15. For the sake of clarity, the front of each reservoir 10 and 11 is shown open, but in practice doors (not shown) would cover the compartments of the reservoirs 10 and 11, so that suction applied to vents 16 and 17 by suction units (not shown) could be effective to draw the loops 12 and 13, respectively, into the reservoirs 10 and 11. The loops 12 and 13 provide safeguards against damage to the tape 3 which could otherwise be caused on rapid acceleration or deceleration of the tape 3.

Each reel 14 and 15 has an associated drive motor 18 and 19, respectively, and an electromagnetically operated brake 20 and 21, respectively. The motors 18 and 19 are supplied over cables 22 and 23, respectively from the unit 9, and the brakes 20 and 21 are controlled over cables 24 and 25, respectively, from the unit 9.

The tape 3 between the reels 14 and 15 passes round drive pulleys of tachometers 26 and 27, round guide pulleys 28 and 29 and past edge guides 30 and 31. The tachometer 26 is positioned to generate signals representative of the speed of the tape 3 between the reel 14 and the reservoir 10, and the tachometer 27 to generate signals representative of the tape speed between the reel 15 and the reservoir 11. The signals from the tachometers 26 and 27 are fed over cables 32 and 33, respectively, to the control unit 9.

The positions of the loops 12 and 13 are sensed by sensing means associated with the reservoirs 10 and 11, respectively. Such sensing means may be as described in our copending patent application Ser. No. 728,647, filed May 13, 1968, in which case each compartment of each reservoir 10 and 11 has a column of apertures 34 through its back wall, the apertures 34 communicating with a channel 35 and thence with a chamber 36 containing a thermistor element which is connected over a cable 37 into a resistance bridge circuit (not shown) within the control unit 9. The bridge circuit provides output signals, dependent upon the position of the corresponding loop, to control the power supplied over the cable 22 or 23 to the corresponding drive motor 18 or 19 so that the loop 12 or 13 remains substantially at a predetermined position in the reservoir 10 or 11.

If for any reason the loop 12 becomes either too short or too long, vents 38 and 39, positioned in the reservoir 10 at the ends of the range of desirable movement of the loop 12, communicate changes in pressure over tubes 40 and 41 to a loop fault detector 42 which passes a signal over a cable 43 to the control unit 9 to cause shutting down of the apparatus and application of the brakes 20 and 21. A similar arrangement is provided in respect of the loop 13.

Adjacent the head assembly 4, two suction brake blocks 44 and 45 are provided. These apply a braking force continuously to the tape 3 and are preferably supplied with suction via a tube 46 connected to the vent 39. The braking force then decreases during a rewind operation in the manner described in our copending patent application Ser. No. 728,139, filed May 10, 1968.

A source 47 of "Rewind" command signals is connected to the control unit 9 via a cable 60 to initiate a rewind routine which is to be described later. The source 47 may be merely a manually-operated switch, or it may be a circuit in another apparatus such as a computer, with which the tape handler is associated in operation.

Referring also to FIG. 2 of the drawings, a tape mark detector 48, positioned adjacent the upper capstan 1, includes a housing 49 containing a lamp 50 and a photocell 51 positioned in a line parallel to the direction of motion of the tape 3, and a lamp 52 and a photocell 53 spaced across the housing from the lamp 50 and the photocell 51, respectively, by approximately half the width of the tape 3. Parallel to the housing 49 is a reflective plate 54, which, in the absence of a tape 3 between the housing 49 and the plate 54, reflects light from the lamps 50 and 52, which are energized via terminals 55, to the photocells 51 and 53, respectively. Output signals from the photocells 51 and 53 pass to a tape mark decoder 56 having output lines 57. The tape mark decoder 56 and a lamp supply source form part of the control unit 9.

When the tape 3 passes between the housing 49 and the plate 54, the reflected light is greatly reduced, and only negligible output signals are passed to the decoder 56. However, tape marks may be formed on the tape 3 to indicate the load point (i.e., the beginning of the tape) and the end of the tape. Such marks may be formed by pieces of reflective material 58 and 59 stuck on to the back of the tape 3 and extending not more than halfway across the tape 3. When either of the marks passes the housing 49, the corresponding photocell is energized and passes a signal to the decoder 56 which generates a "load point" signal or an "end of tape" signal. If the tape is absent from between the housing 49 and the plate 54, both photocells 51 and 53 are energised by reflection from the plate 54, and the decoder 56 generates a "no tape" signal which causes the apparatus to shut down and the brakes 20 and 21 to be applied.

Before a detailed description is given of those circuits in the control unit 9 which are relevant to the present invention, a summary of the operation of the apparatus will now be provided so that the mode of operation of the circuits may be more easily understood.

The tape 3 is loaded into the apparatus by merely threading the tape from the reel 14 round the pulleys 26 and 28, through the tape mark detector and past the capstan 1, the edge guide 30, the brake block 44, the head assembly 4, the brake block 45, the edge guide 31, the capstan 2 and round the pulleys 29 and 27 to the reel 15. When a "load" signal is generated in the control unit, the tape 3 is automatically loaded into the operating position in the reservoirs 10 and 11 by the motors 18 and 19 rotating to give the required amount of slack tape which is sucked into the reservoirs 10 and 11 to form the loops 12 and 13, respectively.

During a normal phase of operation, such as a playback or recording phase, the loops 12 and 13 are maintained substantially in a central position in the reservoirs 10 and 11, as shown in FIG. 1, by operation of the control unit 9 and the drive motors 18 and 19, in response to signals from the tape position sensing means 34, 35, etc., and the tachometers 26 and 27.

During a fast wind phase of operation, such as a rewinding phase, the fastest possible tape reel speed is required, so it is very advantageous to eliminate any unnecessary drag on the tape. In the case of the rewinding phase, the loop in the reservoir 10 is therefore dispensed with in the following manner.

Consider the condition where reels 14 and 15 are initially stationary. When a "rewind" signal is generated by the source 47, operation of the pinch roller actuators is inhibited so that neither capstan 1 nor capstan 2 can drive the tape 3, and the upper loop fault detector 42 is disabled so that the loop 12 may be removed from the reservoir 10 without the apparatus shutting down. A bias signal is applied to the positioning circuits for the loop 13 so that the loop 13 lengthens to a position such as that shown by a chain-dotted line 62. This gives a safeguard against the loop 13 becoming too short because of any velocity lag which may occur in the operation of the loop positioning circuits when the tape 3 is moving at high speed.

To ensure that the reel 14 has, in fact, had time to become stationary after any previous movement there is a delay of approximately ¼ second and then the position sensing means 34, 35, etc., for the loop 12 is made inoperative and the drive motor 18 rotates the reel 14 slowly anticlockwise to withdraw the loop 12 from the reservoir 10 so that the tape 3 takes up a position between tachometer 26 and pulley 28 as indicated by a chain-dotted line 63 in FIG. 1. Withdrawal of the loop 12 causes a reduction in the suction at the brake blocks 44 and 45.

The reel 14 continues to rotate slowly, thereby tending to pull the loop 13 from the reservoir 11, but the lower loop positioning circuits maintain the loop 13 in the position 62, so the tape 3 must start to unwind from the reel 15. This causes rotation of the tachometer 27 which feeds a signal to the control unit 9, causing a gradual increase in torque in the motor 18 for a short period, say, 50 m.s. The speed of the motor 18 then increases at constant acceleration until the tape 3 reaches a terminal velocity.

The rewind phase of operation then continues until either of the following conditions is reached, in each case the sensing of the "load point" mark on the tape 3 being effective to control operation of the apparatus. If the "Rewind" signal is still maintained after the "load point" mark is sensed, the lower reservoir loop fault detector is made inoperative and rewinding continues until the end of the tape 3 passes through the tape mark detector 48 and a "no tape" signal is generated. The apparatus then shuts down.

On the other hand, if the "Rewind" signal terminates when the "load point" mark is sensed, the control unit 9 causes the motor 18 to reverse and to rotate rapidly clockwise so that the tape 3 re-enters the reservoir 10 to form the loop 12 again. The loop 13, which may have shortened to a position such as that indicated by a chain-dotted line 61 in FIG. 1, returns gradually to the central position in the reservoir 11. If the tape 3 is obstructed on reentering the reservoir 10, the motor 18 continues to rotate for a predetermined period, after which the brakes 20 and 21 are applied and the apparatus shuts down.

When the loop 12 passes the short loop detector vent 38, the position sensing circuits for the loop 12 again operate normally and the loop 12 returns to the central position in the reservoir 11. The suction to the brake blocks 44 and 45 returns to normal, the loop fault detector 42 of the reservoir 10 is again made operative and the pinch roller actuators are returned to normal operating conditions. The apparatus is then ready for tape movement to be controlled by the actuators.

Figure 3:
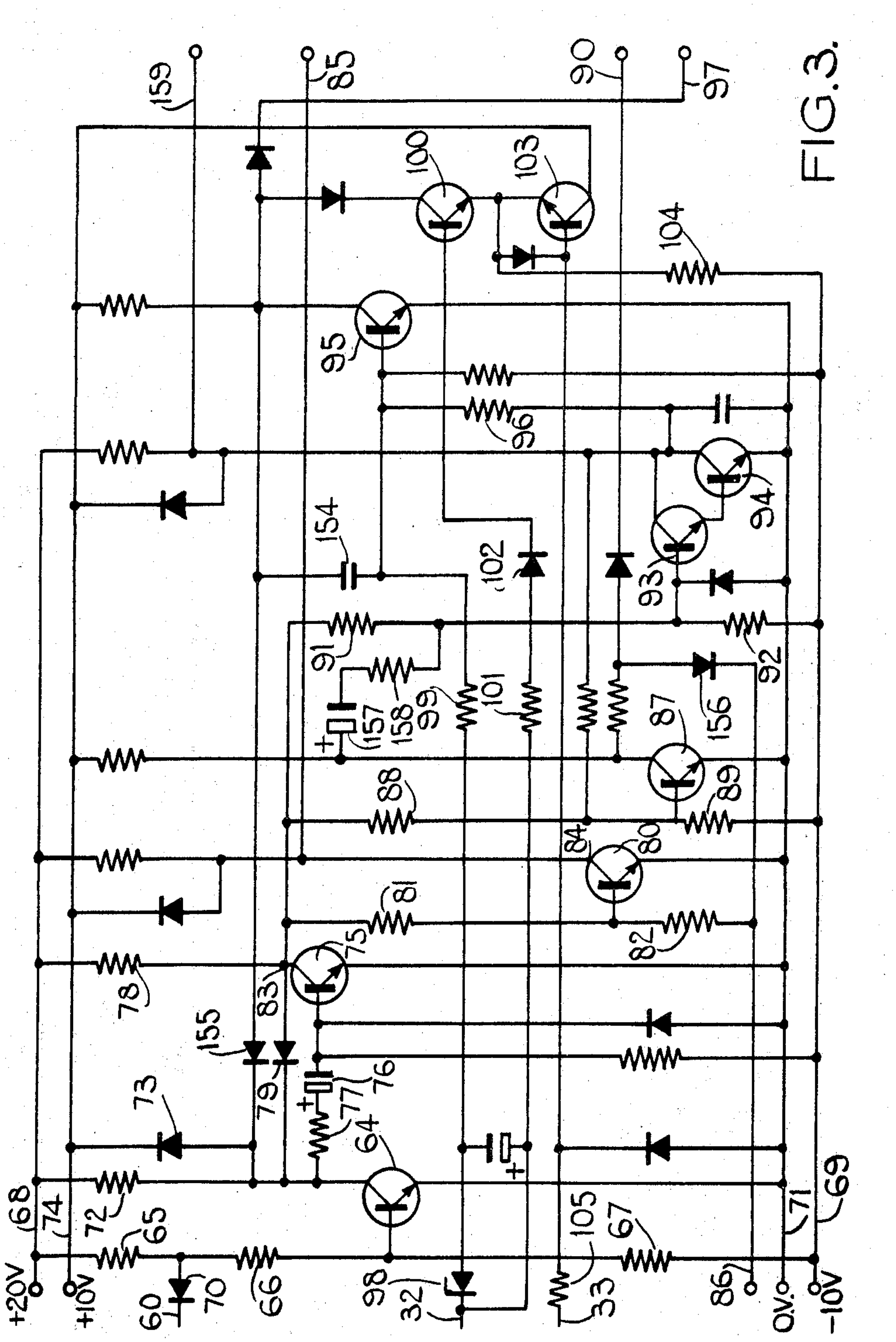
FIG. 3 is a diagram of a rewind control circuit.

Referring now to FIG. 3 of the drawings, the rewind control circuit, which forms part of the main control unit 9, includes a transistor 64, the base electrode of which is biased by a supply from a potential divider formed of resistors 65, 66 and 67 connected between positive (+20 v.) and negative (−10 v.) lines 68 and 69, respectively. The junction between resistors 65 and 66 is connected via a diode 70 to the output line 60 from the "Rewind" signal source 47 (FIG. 1). The emitter electrode of the transistor 64 is connected to a zero volt line 71 and the collector electrode is connected through a resistor 72 to the line 68. Application of the negative "Rewind" signal to the base electrode of the transistor 64 causes the transistor 64 to be cut off so that the collector electrode becomes more positive, but it is prevented from rising above +10 v. by a diode 73 connected between it and a +10 v. line 74.

A normally cut off transistor 75 has its collector electrode clamped through a diode 79 to the collector electrode of the transistor 64, so that as the latter collector electrode becomes more positive, a junction 83 between the collector electrode of transistor 75 and a resistor 78 connected to the line 68 can also rise to a more positive level. To provide the required delay, the base electrode of the transistor 75 is, however, connected through a long time-constant circuit, including a capacitor 76 and a resistor 77, to the collector electrode of the transistor 64 so that as the latter collector electrode becomes more positive the potential of the base electrode of transistor 75 rises slowly and the transistor 75 begins to conduct. The potential of the junction 83 therefore falls slowly before rising again slowly to the above-mentioned more positive level as the charge on the capacitor 76 decays.

The base electrode of a transistor 80 is connected to the junction 83 by a potential divider formed of resistors 81 and 82. The base electrode potential therefore follows that of the junction 83 and the collector electrode 84 of the transistor 80 produces an inverted output signal which is fed on an "amplifier clamp" line 85 to a servo amplifier which will be described later. Thus, the line 85 is maintained at a low potential while the "Rewind" signal is applied to the line 60. A line 86, which is included in the cable 43 (FIG. 1) from the loop fault detector 42 carries a "loop failure" signal when the upper tape loop 12 leaves the reservoir 10. The "loop failure" signal applied over the line 86 is positive-going, and is applied to raise the base electrode potential of transistor 80, thereby causing the potential at the collector electrode 84 to be low, and thus maintaining the line 85 at a low potential when the "Rewind" signal ceases as will be described later.

A further transistor 87 has its base electrode connected to the junction 83 by a potential divider comprising resistors 88 and 89. Therefore whilst the "Rewind" signal is applied to the line 60, the collector electrode, and hence a "forward trigger" line 90 indirectly connected thereto, are held at a low potential. The positive-going potential at the junction 83 is also fed through potential dividing resistors 91 and 92 to the input base electrode of a transistor pair 93 and 94, the collector electrodes of which are interconnected and feed the base electrode of a transistor 95 through a resistor 96. The application of the "Rewind" signal on the line 60 therefore causes a voltage on a "reverse trigger" line 97 connected to the collector electrode of the transistor 95 to dwell for the delay period, of a fraction of a second, and then to rise to a higher level than before the "Rewind" signal was applied.

The cable 32 from the upper tachometer 26 (FIG. 1) is connected via a Zener diode 98 and a resistor 99 to the base electrode of the transistor 95 and is also connected to the base electrode of a transistor 100 through a resistor 101 and a diode 102. The collector electrode of the transistor 100 is connected indirectly to the reverse trigger line 97.

A further transistor 103 is connected in a long-tailed pair circuit with the transistor 100, the transistors 100 and 103 having a common emitter resistor 104. The base of the transistor 103 is connected through a resistor 105 to the cable 33 from the lower tachometer 27 (FIG. 1).

In operation of the circuit shown in FIG. 3, therefore, application of a "Rewind" signal on the line 60 causes the forward trigger line 90 to be held at a low potential and causes generation of a positive-going signal, after a short delay, on the reverse trigger line 97 and a negative-going signal on the amplifier clamp line 85. The reverse trigger signal is used initially to cause the upper reel motor 18 to wind tape up to pull the loop 12 slowly from the reservoir 10 (FIG. 1). Velocity feedback is applied to the transistor 100 by the tachometer 26 through the line 32, the resistor 101 and the diode 102, thus limiting the reverse trigger signal amplitude. The operation of the motor servo and power supply will be described later. When the tape 3 is out of the reservoir 10, the tachometer 27 starts to rotate, thereby applying an increasing signal to the cable 33, and hence to the transistors 103 and 100. The potential of the reverse trigger line 97 therefore rises, thereby increasing the speed of the motor 18.

After a short period, the voltage on the cable 33 is sufficient to saturate the transistor 103 and the transistor 100 cuts off due to insufficient emitter/collector voltage and the lower tachometer 27 therefore has no further effect on the speed of the motor 18, which increases at constant acceleration under the control of acceleration feedback through a capacitor 154 and the transistor 95 until a maximum terminal tape speed, controlled by current through the Zener diode 98, is reached.

When the load point mark is sensed, the "Rewind" signal is normally cancelled. Transistor 64 then conducts, transistor 87 ceases to conduct, the reverse trigger line 97 is returned to a low level through a diode 155 and the forward trigger line 90 is allowed to go positive. The tape 3 therefore reenters the reservoir 10 (FIG. 1) and passes the short loop vent 38, thereby causing the "loop failure" line 86 to return to a low level. The forward trigger signal is therefore removed from the line 90 through a diode 156.

If the tape is obstructed, so that it does not reenter the reservoir 10, the "loop failure" signal on line 86 does not clear, but after a time determined by capacitor 157 and resistor 158, transistors 93 and 94 cease to conduct. A line 159 connected to the collector electrodes of transistors 93 and 94 becomes positive and causes the brakes 20 and 21 to be applied and the apparatus shuts down. Thus, the line 159 is controlled by the transistors 93 and 94 to disable the "loop failure" circuit while the "Rewind" signal is present, in a manner to be explained later.

Figure 4:
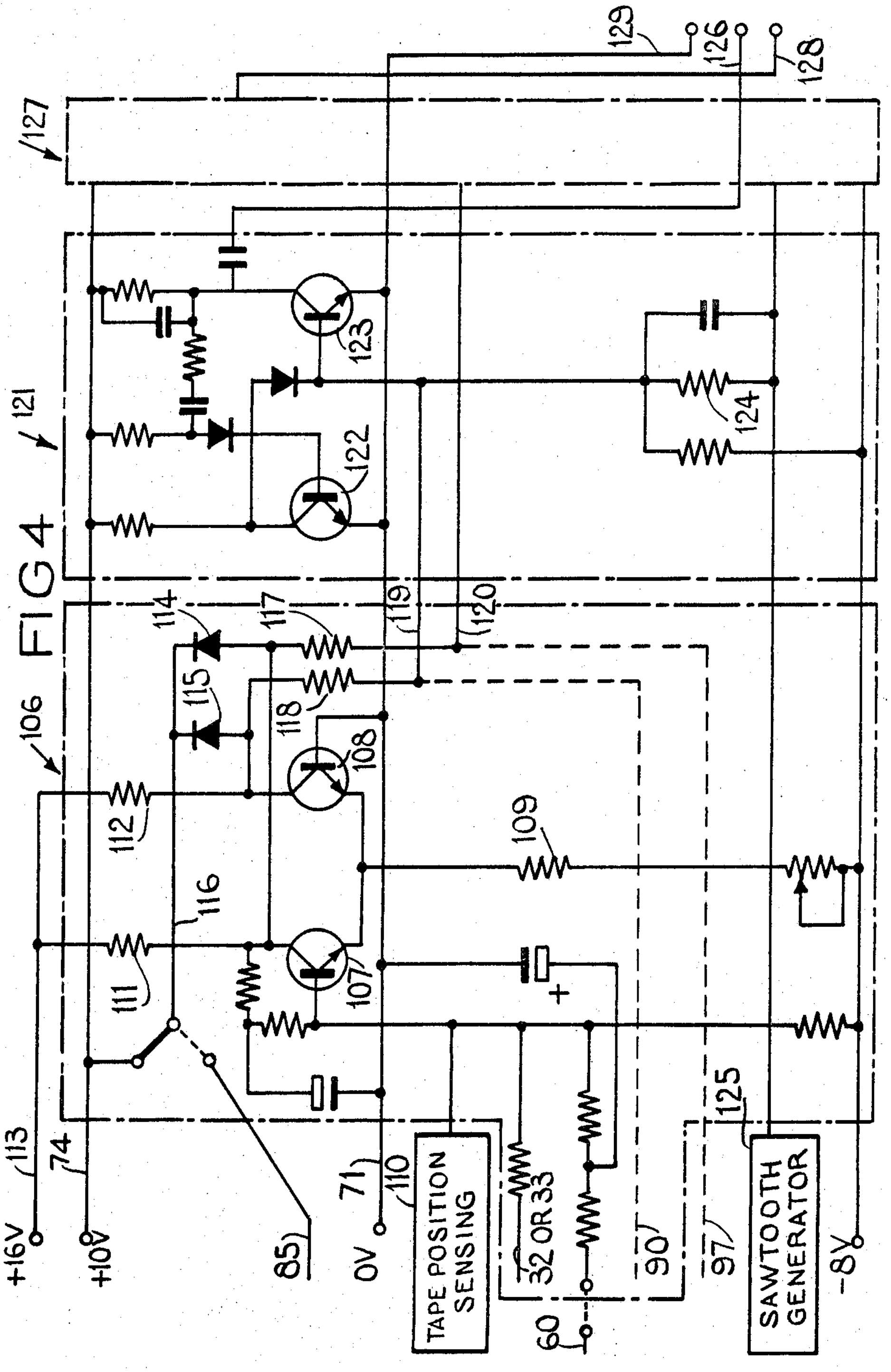
FIG. 4 is a partly schematic circuit diagram of a servo amplifier unit.

Referring now to FIGS. 1 and 4 of the drawings, each reel drive motor is controlled by a separate servo amplifier 106, respectively. Each amplifier 106 includes a pair of transistors 107 and 108 having a common emitter resistor 109. To the base electrode of the transistor 107 are connected the output from a tape position sensing device 110 for the corresponding reservoir 10 or 11, and the output of the corresponding tachometer 26 or 27 on the cable 32 or 33, respectively. The tape position sensing device 110 is included within the loop fault detectors, such as 42 (FIG. 1) and is described in greater detail in the copending patent application Ser. No. 728,647 referred to earlier.

It is to be noted that there are minor differences in the connections applied to the servo amplifiers 106 associated respectively with the upper and lower motor reels, and these differences will be specifically pointed out in the following description. In the case of the lower reel drive motor servo, for example, an additional connection, indicated in FIG. 4 by a dashed connection, is provided from the "Rewind" signal line 60 to the base electrode of the transistor 107.

The collector electrodes of the transistors 107 and 108 are connected via resistors 111 and 112 to a +16 v. line 113, and are connected via diodes 114 and 115, respectively, to a line 116. The line 116 is, in the case of the amplifier 106 associated with the lower servo, connected to the +10 v. supply line 74, whereas in the upper servo amplifier the line 116 is connected to the amplifier clamp line 85 (FIG. 3).

The collector electrodes of the transistors 107 and 108 are also coupled, through resistors 117 and 118 respectively to lines 120 and 119 respectively to reverse and forward trigger circuits which control the operation of the reel motors. In the case of the upper servo amplifier only additional connections are provided from the forward and reverse trigger lines 90 and 97 to the lines 119 and 120, respectively, as indicated in FIG. 4 by dashed connecting lines.

In a record or playback operation of the lower servo amplifier, signals from the lower tape position sensing device 110 and the lower tachometer 27 together are effective to cause the lower servo amplifier 106 to produce a signal on a line 119 or a line 120 to initiate the required forward or backward rotation, respectively, of the reel 15 to keep the loop 13 in a central position in the reservoir 11. However, when the negative "Rewind" signal is applied to the line 60, the lower servo amplifier is biassed to length the loop 13 to the position 62 by the application of the "Rewind" signal to the line 60.

In a record or playback operation, the upper servo amplifier operates in the same manner as the lower servo amplifier, since the amplifier clamp line 85 is at +10 v. and the line 116 is therefore at the same potential for both upper and lower servo amplifiers. The forward and reverse trigger lines 90 and 97 are ineffective. When the "Rewind" signal is applied to the rewind control circuit (FIG. 3), however, the line 85 becomes negative, thereby inhibiting the normal operation of the transistors 107 and 108 in the upper servo amplifier 106. The forward and reverse trigger lines 90 and 97 then feed signals to the lines 119 and 120, respectively.

The line 119 feeds a forward trigger circuit 121, which includes a monostable transistor pair 122 and 123. The base electrode of the transistor 123 is connected to the line 119, and via a resistor 124 to a sawtooth generator 125 which generates a sawtooth waveform synchronised with the A.C. supply for the apparatus. The sawtooth waveform added to the signal on the line 119 triggers the circuit 121, the point on the sawtooth waveform at which triggering takes place being dependent upon the magnitude of the signal on the line 119. Hence the latter signal varies the time in the sawtooth cycle, and hence in the A.C. supply cycle, at which triggering takes place. An output signal from the collector electrode of the transistor 123 is fed to a "forward pulse" line 126 for operating the motor supply, which will be described later.

A similar circuit 127, which is indicated merely as a chain-dotted box in FIG. 4, is effective to provide pulses on a "reverse pulse" line 128 in response to the sawtooth waveform from the generator 125 and signals on the line 120. A line 129 provides a common return path for both forward and reverse pulses.

Clearly, for each drive motor 18 and 19 there is provided an amplifier 106, a forward trigger circuit 121 and a reverse trigger circuit 127. A single sawtooth generator 125 is sufficient for all the trigger circuits.

Figure 5:
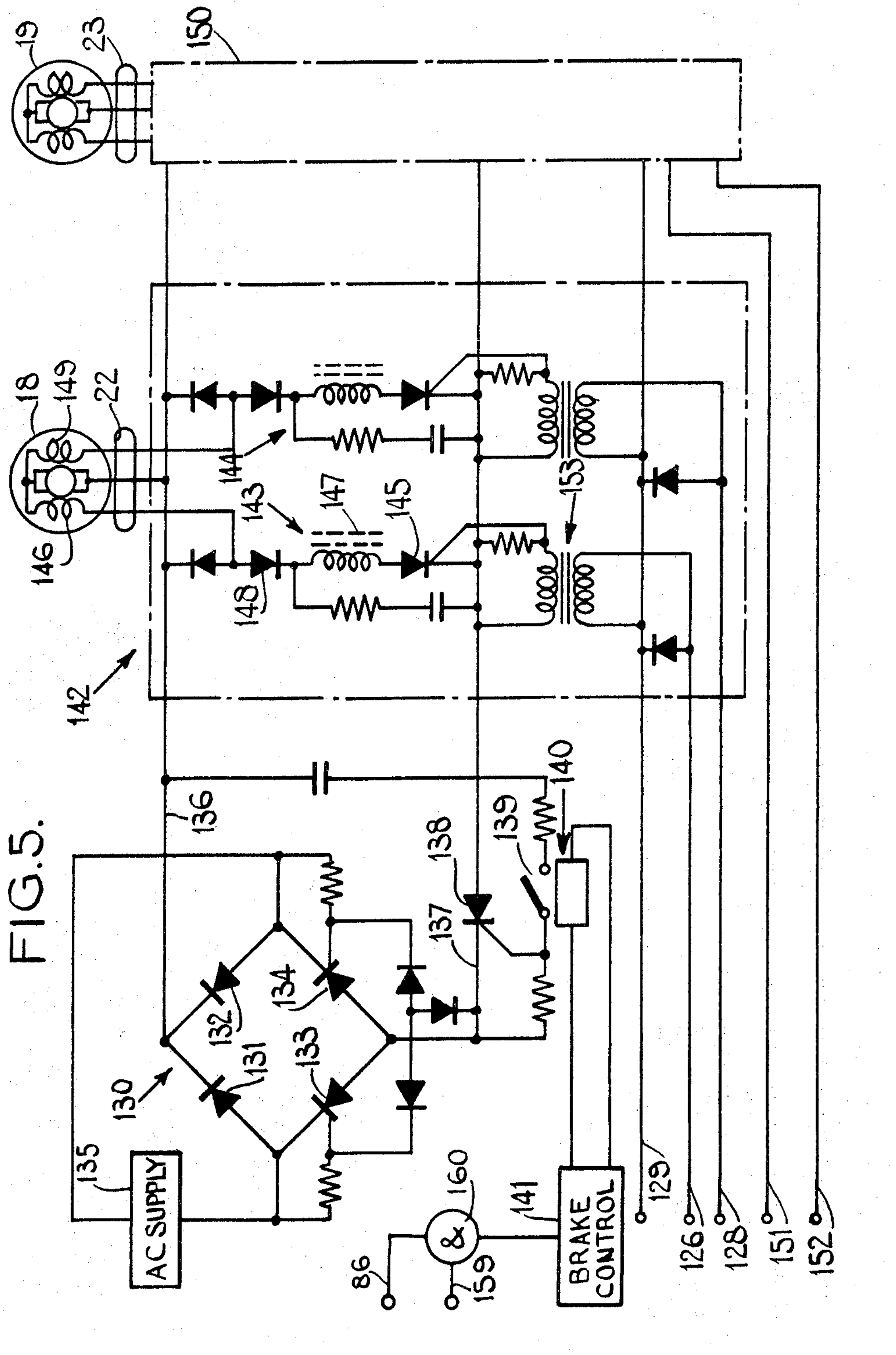
FIG. 5 is a partly schematic circuit diagram of a servo motor supply unit.

Referring now also to FIG. 5 of the drawings, a power supply circuit for the motors 18 and 19 includes a rectifier bridge circuit 130 having normal rectifiers 131 and 132 in two arms of the bridge and silicon controlled rectifiers (S.C.R.'s) 133 and 134 in the other arms. The bridge 130 is fed from an A.C. supply 135 which may be an autotransformer giving an output of 125 volts. The S.C.R.'s 133 and 134 cause the potential on bridge output lines 136 and 137 to rest at zero for an appreciable time at the beginning of each half cycle to ensure that other S.C.R.'s in the motor drive circuit are turned off during each half cycle.

An S.C.R. 138, connected in series with the output line 137, is controlled by contacts 139 on a relay 140 operated by a brake control 141, so that operation of the brakes 20 and 21 also open-circuits the motor supply. The brake control 141 is operated in response to a "loop failure" signal on the line 86. This signal is gated by an AND gate 160 controlled by the line 159 from the rewind control circuit (FIG. 3), so that the gate 160 effectively disables the "loop failure" signal from the upper loop fault detector 42.

A forward/reverse supply 142 for the motor 18 includes a pair of identical circuits 143 and 144. The circuit 143 includes an S.C.R. 145 which is connected via the cable 22 to a forward winding 146 of the motor 18 through a choke 147 and a diode 148. The control electrode of the S.C.R. 145 is connected to the secondary winding of a pulse transformer 153, which has its primary winding connected to the forward pulse and return lines 126 and 129, respectively. The circuit 144 is connected to a reverse winding 149 on the motor 18 and to the reverse pulse and return lines 128 and 129, respectively.

The forward or reverse pulses on the lines 126 and 128 cause the corresponding S.C.R. 145 to conduct, the timing of the pulse being effective to determine the firing point of the S.C.R. in the supply half-cycle, therefore controlling the power fed to the motor 18.

An identical supply 150, indicated by a chain-dotted line, feeds the motor 19 in response to forward and reverse pulses from the lower servo amplifier and trigger circuits over lines 151 and 152, respectively.

Hence the power supplied to the motors 18 and 19 varies in dependence upon the position of the loop in the corresponding reservoir, upon the output signals from tachometers 26 and 27 and upon whether a "Rewind" signal is present on the line 60.

It should be noted that when the "Rewind" signal is removed from the lower servo amplifier 106 (FIG. 4) and the amplifier clamp line 85 on the upper servo amplifier 106 is deenergized, each motor drive is controlled once again by the position sensing means for the corresponding reservoir and the loop 12 or 13 returns to the central position in the reservoir 10 or 11, respectively.

Although various circuits have been described above, the invention is not limited to those particular configurations, and other circuits could be used for performing similar operations.

Although tachometers 26 and 27 have been used in the above embodiment because they are convenient devices for measuring tape speed, other devices could be used. For example, during rewinding it will be realised that the output from the lower tachometer 27 is used to control the point at which the upper reel motor 18 is permitted to accelerate. Hence, alternative devices for indicating that the upper loop has been completely withdrawn, or that tape movement between the lower reservoir and the lower reel has commenced, may be employed for this purpose.

An auxiliary reservoir (not shown) may be provided between each reservoir 10 and 11 and the corresponding pulley 28 and 29, and a suction vent for the upper auxiliary reservoir may be used to provide the suction for the brake blocks 44 and 45.

The reservoirs 10 and 11 need not comprise two compartments each, but may comprise merely a single compartment.

Although the operation of rewinding has been described in detail, it will be realised that a fast wind operation may be required to move the tape in either direction, for rapid location of a particular part of the tape, for example. The present invention may, of course, be applied to control such fast winding operation, to ensure that the tape loop is withdrawn from that reservoir nearest the reel which is required to take up tape and to permit that reel to accelerate to a maximum speed once such withdrawal is complete, the completion of withdrawal being sensed by the commencement of movement of tape from the opposite reel into its associated reservoir.

I claim:

1. Tape handling apparatus including first and second reels, about which opposite ends an elongate tape may be wound; a pair of drive motors, one for each of said reels, selectively operable to rotate the reels respectively to move tape along a path from one reel to the other; first and second tape reservoirs associated respectively with said first and second reels, each reservoir arranged to hold a loop of tape, the reservoirs being positioned adjacent the tape path between the reels; control means operatively connected to the drive motors to produce movement of the tape, including means for maintaining a predetermined loop of tape in each of the reservoirs during movement in a first phase of operation; and means for generating an indicating signal representing movement of tape between said second reel and said second reservoir, and thereby representing the withdrawal of tape from said first reservoir; and a signal generator connected to the control means operable to produce a fast wind signal signifying a second phase of operation, the control means (a) being responsive to said fast wind signal to initiate said second phase and to operate that motor associated with said first reel at a slow speed to withdraw the tape from said first reservoir only, and (b) being responsive to said indicating signal during said second phase of operation to cause acceleration of said drive motor associated with said first reel after the tape has been withdrawn from said first reservoir, and (c) being responsive to said fast wind signal to modify said loop-maintaining means to maintain a loop of increased size in said second reservoir throughout said second phase of operation.

2. Apparatus as claimed in claim 1 in which the means for maintaining the tape loops includes tape loop position sensing means for each reservoir effective in operation to produce position signals indicative of the size of tape loop within the reservoirs, said control means being responsive to said position signals to coordinate the operation of both motors to maintain the loops in both reservoirs at predetermined sizes during said first phase, the control means further including circuit means responsive to said fast wind signal for rendering said position signals from the first reservoir tape loop position sensing means ineffective during the second phase.

3. Apparatus as claimed in claim 1 in which said tachometer means includes a first tachometer arranged to produce an output in response to tape movement between the first reservoir and the first reel, and said control means includes further circuit means responsive to the output from said first tachometer to maintain operation of said motor associated with said first reel at slow speed throughout withdrawal of tape from said first reservoir.

4. Apparatus as claimed in claim 3 in which said tachometer means for generating an indicating signal is a second tachometer arranged to produce an output in response to tape movement between said second reservoir and said second reel and in which said control means further includes circuit means responsive to the output from said second tachometer to counter the effect of the output from said first tachometer during said second phase to permit acceleration of said motor associated with said first reel.

5. Apparatus as claimed in claim 4 in which said control means further includes circuit means for limiting the maximum speed of said motor associated with said first reel during said second phase.

6. Tape handling apparatus including first and second reels about which opposite ends of an elongate tape may be wound, first and second drive motors selectively operable to rotate the reels, respectively, to move the tape along a path from one reel to the other; first and second tape reservoirs associated respectively with said first and second reels, each reservoir arranged to hold a loop of tape during a first phase of operation; control means connected to the first and second drive motors to produce movement of the tape; a signal generator connected to the control means operable to produce a fast wind signal signifying a second phase of operation; the control means being responsive to said fast wind signal to operate the first drive motor at slow speed to withdraw said tape from the first reservoir only; means for generating an indicating signal for indicating the withdrawal of tape from said first reservoir, said means including a tachometer which produces said indicating signal in response to movement of tape between said second reel and said second reservoir, said indicating signal being applied to said control means to cause acceleration of said first drive motor during the second phase of operation.

References Cited

UNITED STATES PATENTS 3,343,758 9/1967 Hemdal ---------- 242—55.12

LEONARD D. CHRISTIAN, Primary Examiner

U.S. Cl. X.R.

318—69, 77